United States Patent
Kawamura

[11] Patent Number: 5,979,420
[45] Date of Patent: Nov. 9, 1999

[54] FUEL HEATING APPARATUS FOR ENGINES USING HEAVY OIL AS FUEL

[75] Inventor: Hideo Kawamura, Samukawa-machi, Japan

[73] Assignee: Isuzu Cermamics Research Institute Co., Ltd., Kanagawa-ken, Japan

[21] Appl. No.: 08/965,414

[22] Filed: Nov. 6, 1997

[30] Foreign Application Priority Data

Nov. 25, 1996 [JP] Japan .................................. 8-328031

[51] Int. Cl.⁶ .................................................. F02B 15/00
[52] U.S. Cl. ............................................................ 123/557
[58] Field of Search ................................. 123/549, 557, 123/90.11

[56] References Cited

U.S. PATENT DOCUMENTS

| | | | |
|---|---|---|---|
| 1,384,512 | 7/1921 | Buchi | 123/557 |
| 1,623,074 | 5/1927 | Tartrais | 123/557 |
| 4,094,275 | 6/1978 | Auiler et al. | 123/557 |
| 4,471,744 | 9/1984 | Holtz | 123/557 |
| 5,022,353 | 6/1991 | Kamamura | 123/90.11 |

FOREIGN PATENT DOCUMENTS

| | | |
|---|---|---|
| 9-217624 | 8/1997 | Japan . |
| 9317470 | 12/1997 | Japan . |
| 9317471 | 12/1997 | Japan . |

Primary Examiner—Marguerite McMahon
Attorney, Agent, or Firm—Browdy and Neimark

[57] ABSTRACT

This invention provide a fuel heating apparatus for engines using a heavy oil as a fuel, wherein the heavy oil is heated by utilizing the exhaust gas energy so as to promote an increase in the fluidity thereof. This fuel heating apparatus can be applied to a diesel engine in which a heavy oil is injected from fuel injection nozzles into combustion chambers by an operation of a fuel injection pump to which the heavy oil is supplied from a fuel tank through a fuel passage. An exhaust gas passage to which the exhaust gas from the combustion chambers is discharged is connected to a heat exchanger provided in the fuel tank and a heat exchanger provided around the fuel passage, and the heavy oil in an outlet region of the fuel tank and that flowing in the fuel passage are heated with the energy of the exhaust gas. Thus, the heavy oil is fluidized, and the injection of the heavy oil from the injection nozzle into the combustion chamber is done smoothly.

16 Claims, 3 Drawing Sheets

FUEL HEATING APPARATUS FOR ENGINES USING HEAVY OIL AS FUEL

BACKGROUND OF THE INVENTION

1. Field of the Invention

This invention relates to a fuel heating apparatus used in an engine adapted to ignite and burn a fuel (which will hereinafter be referred to by a generic name "heavy oil") of a high viscosity, such as a heavy oil injected into a combustion chamber by an operation of a fuel injection pump, and lower the viscosity of such a fuel by heating the same.

2. Description of the Prior Art

In general, light oil is burnt as a fuel in a fuel chamber in a diesel engine. The light oil has a high cetane value and not so high a viscosity, and is suitable to be uniformly distributed as an atomized fuel into a combustion chamber. In order to reduce the amounts of particulates and NOx component in an exhaust gas from a recent diesel engine to a very low level, the atomization of a fuel in a combustion chamber is attained by compressing the air under a high pressure in the combustion chamber, and injecting the fuel thereinto under a superhigh pressure. The fuels generally used for an engine include gasoline, light oil and heavy oil. The viscosity of gasoline is 0.1 cSt, light oil 1.8–2.7 cSt, A-heavy oil 20 cSt, B-heavy oil 50 cSt, and C-heavy oil 50–400 cSt. The cetane value of light oil is not lower than 40, while the cetane value of heavy oil is as low as around 25. The fuel cost of light oil is about 70, and that of heavy oil about 15 with respect to a base fuel cost 100 of, for example, gasoline.

Many of the conventional generating apparatuses comprising cogeneration systems are systems formed by mounting a generator on an engine. In the generation of electric power by a diesel engine, the fuel cost becomes high because a diesel engine uses light oil as a fuel, so that the advantageousness cannot be secured due to the high cost.

In a low-speed marine engine, the revolution speed of which is not more than 200 rpm, the time for mixing a fuel and air with each other is long, enabling a gaseous mixture to be made with use of a heavy oil. However, in a high-speed diesel engine, the revolution speed of which is not less than 1000 rpm, the time for forming a gaseous mixture becomes short, so that using a heavy oil as a fuel is very difficult. In a generating apparatus using a diesel engine, a high-speed diesel engine is used. If a heavy oil of a low fluidity can be ignited and burnt as a fuel in a high-speed diesel engine, the fuel cost can be reduced, and the power cost can also be lowered greatly, this oil being thereby proved useful. However, when the viscosity of a fuel is high like that of heavy oil, the atomization and injection thereof using a fuel injection pump, which is adapted to compress a fuel under a high pressure in a high-speed diesel engine, becomes difficult. Especially, when the temperature of the atmospheric air is low, the fluidity of the heavy oil is low under these circumstances a fuel injection pump cannot be used or can a heavy oil as a fuel be injected into a combustion chamber of the high-speed diesel engine. Especially, in a generating apparatus provided with a large-scale fuel tank, the problem concerning the viscosity of the heavy oil becomes serious when the atmospheric temperature is low.

In view of the above, if a heavy oil can be utilized as a fuel in a load dispatching device using a diesel engine, the fuel cost can be greatly reduced. Accordingly, it is conceivable that the heavy oil be heated to give a fluidity thereto for the purpose of injecting the heavy oil under a high pressure into a combustion chamber.

The applicant of the present invention developed diesel engines using a heavy oil as a fuel, and filed, for example, Japanese Patent Laid-Open No. 217624/1997 and Japanese Patent Application Nos. 151910/1996 and 151911/1996. In such diesel engines, a heavy oil as a fuel can be atomized excellently and injected into a combustion chamber by giving a fluidity thereto. Therefore, it is desired that a fluidity be given to a heavy oil. An issue of finding out a method of heating a heavy oil, which is supplied from a fuel tank, at a low cost and with a high effectiveness with the possibility of improving the fluidity of the heavy oil by heating the same taken into consideration then arise.

However, in an engine using a heavy oil as a fuel, the viscosity of the oil becomes so high that the oil becomes like thick malt syrup in a season of a low temperature, such as winter. In a marine engine, the fluidity of a fuel is improved in the existing circumstances by heating the same by a burner. Utilizing a burner to heat a heavy oil causes a fuel to be consumed, and the operating cost to increase in consequence. When a cooled diesel engine is used as a cogeneration system, hydrocarbons account for a greater part of the components of an exhaust gas from the engine, and, moreover, the exhaust gas maintains a temperature of around 500° C. Consequently, the temperature of the atmospheric air in city and urban areas increases due to the that of exhaust gas as the cogeneration system spreads.

If a heavy oil can be heated by using a heat exchanger utilizing an exhaust gas from a diesel engine, so as to reduce the viscosity of the heavy oil, increase the injection pressure of a fuel injection pump and attain the atomization of a gaseous mixture, the fuel cost can be greatly reduced, and the thermal energy of the exhaust gas can be absorbed by the heat exchanger. Therefore, the temperature of the exhaust gas decreases, and a temperature rise problem posed by the exhaust gas can be solved. Since the thermal energy of the exhaust gas is absorbed by the heat exchanger, it becomes necessary to solve the problem of developing an efficient exhaust gas recovering method and a method of preventing the heat exchanger from being oxidized and corroded due to the exhaust gas.

SUMMARY OF THE INVENTION

An object of the present invention is to solve these problems, and provide a fuel heating apparatus for engines using as a fuel a heavy oil of a high viscosity and a low vaporability, capable of injecting a heavy oil from a fuel injection nozzle under a high pressure by heating the heavy oil by a heat exchanger, which utilizes the thermal energy of an exhaust gas discharged from a combustion chamber, so as to reduce the viscosity and improve the fluidity of the heavy oil; and preventing ill influence from being exerted on the environment by reducing the temperature of the exhaust gas, the exhaust gas-contacting surface area of the relative parts including a fuel passage being increased so as to improve the efficiency of the heat exchanger by which the heavy oil is heated, the members which the exhaust gas contacts being formed out of a porous ceramic material and a porous fibrous material so as to improve the oxidation resistance and corrosion resistance thereof.

This invention relates to a fuel heating apparatus for engines using a heavy oil as a fuel, comprising a heavy oil-holding fuel tank, a fuel injection pump to which the heavy oil is supplied from the fuel tank through a fuel passage, fuel injection nozzles adapted to inject the heavy oil into combustion chambers by an operation of the fuel injection pump, an exhaust gas passage through which the exhaust gas, which is generated when the heavy oil is ignited and burnt in the combustion chambers, is discharged, a first heating unit which is provided in the vicinity of a fuel outlet region of the fuel tank connected to the fuel passage, and which is adapted to heat the heavy oil by utilizing the exhaust gas, and a second heating unit which is provided in the fuel passage connected to the fuel injection pump, and which is adapted to heat the heavy oil by utilizing the exhaust gas.

Each of the first and second heating units comprises a heat exchanger adapted to heat the heavy oil with the thermal energy of the exhaust gas discharged from the combustion chamber, and thus reduce the viscosity of the heavy oil.

The first heating unit comprises a member of a porous ceramic material provided in a bottom portion of the fuel tank and formed so that the heavy oil passes therethrough, an exhaust pipe provided in the porous ceramic member and forming a wall for separating passages for the exhaust gas and heavy oil from each other, which exhaust pipe is joined at one end thereof to the exhaust pipe and opened at the other end thereof to the atmospheric air, a fuel pipe provided with communication ports from which the heavy oil passed through the passage formed of a porous ceramic member is discharged into the fuel passage, and a first heater provided in a fuel pipe.

In the exhaust pipe in the first heating unit, ceramic lattices or porous ceramic members are provided, and the exhaust gas contacting surface area of the exhaust passage formed by the exhaust pipe is set not less than three times as large as the area of the surface which the heavy oil passing through the porous passage formed of the porous ceramic member contacts.

The second heating unit comprises a casing through which the exhaust gas passes, a ceramic pipe extending through the casing and formed so that the heavy oil passes therethrough, a porous ceramic member provided in the casing so as to enclose the ceramic pipe, and a second heater provided in the ceramic pipe.

In the ceramic pipe in the second heating unit, ceramic lattices and porous ceramic members are provided, and the area of a surface which the exhaust gas flowing in the porous passage of the porous member contacts is set not less than three times as large as that of a surface which the heavy oil passing through the ceramic pipe contacts.

The ceramic material constituting the first and second heating units comprises $Si_3N_4$, SiC or AlN having a high thermal conductivity.

The exhaust gas passage is provided therein with an exhaust gas-operated turbocharger, and in the portion thereof which is on the downstream side of the turbocharger with an exhaust gas-operated energy recovery turbine.

The first heating unit is provided with the first heater, and the second heating unit the second heater. The first and second heaters are heated electrically when the temperatures of the outside air and exhaust gas are lower than predetermined levels, and turned off when these temperatures are higher than the predetermined levels.

This fuel heating apparatus further has a first heavy oil heating heater provided in the first heating unit, a first exhaust gas control valve which is used to regulate a flow rate of the exhaust gas supplied to the first heating unit, and which is provided in the exhaust gas passage, a second heavy oil heating heater provided in the second heating unit, a second exhaust gas control valve which is used to regulate a flow rate of the exhaust gas supplied to the first and second heating unit, and which is provided in the exhaust gas passage, and a controller for controlling the operations of the first and second heaters and the first and second exhaust gas control valves.

In this fuel heating apparatus, the controller is adapted to supply an electric current to the first and second heaters when the temperature of the outside air is low, and when the engine is started, and control the heating of the heavy oil.

Since this fuel heating apparatus is constructed as described above, heating units comprising heat exchangers can be provided in the fuel outlet region of the fuel tank and in an intermediate portion of the fuel passage extending to the fuel injection pump, and the fuel, i.e. the heavy oil can be heated by utilizing the thermal energy of the exhaust gas, whereby the fluidity of the heavy oil can be increased. When the temperature of the exhaust gas is low, the heavy oil is heated by supplying an electric current to the heaters provided in the heat exchangers, and, the heaters are turned off when the engine has been put in a steady operating condition with the temperature of the exhaust gas properly increased. Thus, the fuel is heated with the exhaust gas energy alone to minimize the power consumption.

Moreover, the heating units comprise heat exchangers utilizing as heat exchange materials a porous ceramic material and porous ceramic members of fiber provided independently by shutting off the ceramic passage, in which the exhaust gas flows, from the passage, in which the fuel flows, by a partition wall, and whereby enlarging the heat transfer surface area, whereby the heavy oil can be efficiently heated with the conduction of heat from the exhaust gas to the fuel rendered excellent.

In this fuel heating apparatus, the fluidity of the heavy oil is set higher by heating heavy oil with the heating units as mentioned above, the oil can be injected into a combustion chamber by a fuel injection pump and a fuel injection nozzle for a diesel engine. This enables a heavy oil to be used for a high-speed diesel engine. The heating units can utilize the exhaust gas energy as the energy for heating the heavy oil. When the temperature of the exhaust gas is low, an electric current is supplied to the heaters, whereby the heavy oil can be heated. The controlling of these operations can be done by the controller which receives the information on the operating condition of the engine, and the power consumption can be minimized.

Moreover, the electric power accumulated in a battery can be utilized as electric power supplied to the heaters by the operations of the turbocharger and energy recovery turbine, which are provided in the diesel engine, during a steady operation and a high-load operation of the engine, so that the effective resource utilizing capability can be fully displayed. Since the thermal energy of the exhaust gas discharged from the diesel is recovered by the turbocharger, energy recovery turbine and heavy oil heating units, the temperature of the outside air does not increase. Therefore, for example, even when the diesel engine is operated in a city area, the environment is not deteriorated.

Accordingly, this fuel heating apparatus can be applied to a fixed type load dispatching device of a cogeneration system using a large-scale fuel tank, permits the use of heavy oil as a fuel and is capable of reducing the fuel cost greatly, reducing the power cost as well, and being used throughout the year without being influenced by the seasons.

DETAILED DESCRIPTION OF THE EMBODIMENT

Figure 1:
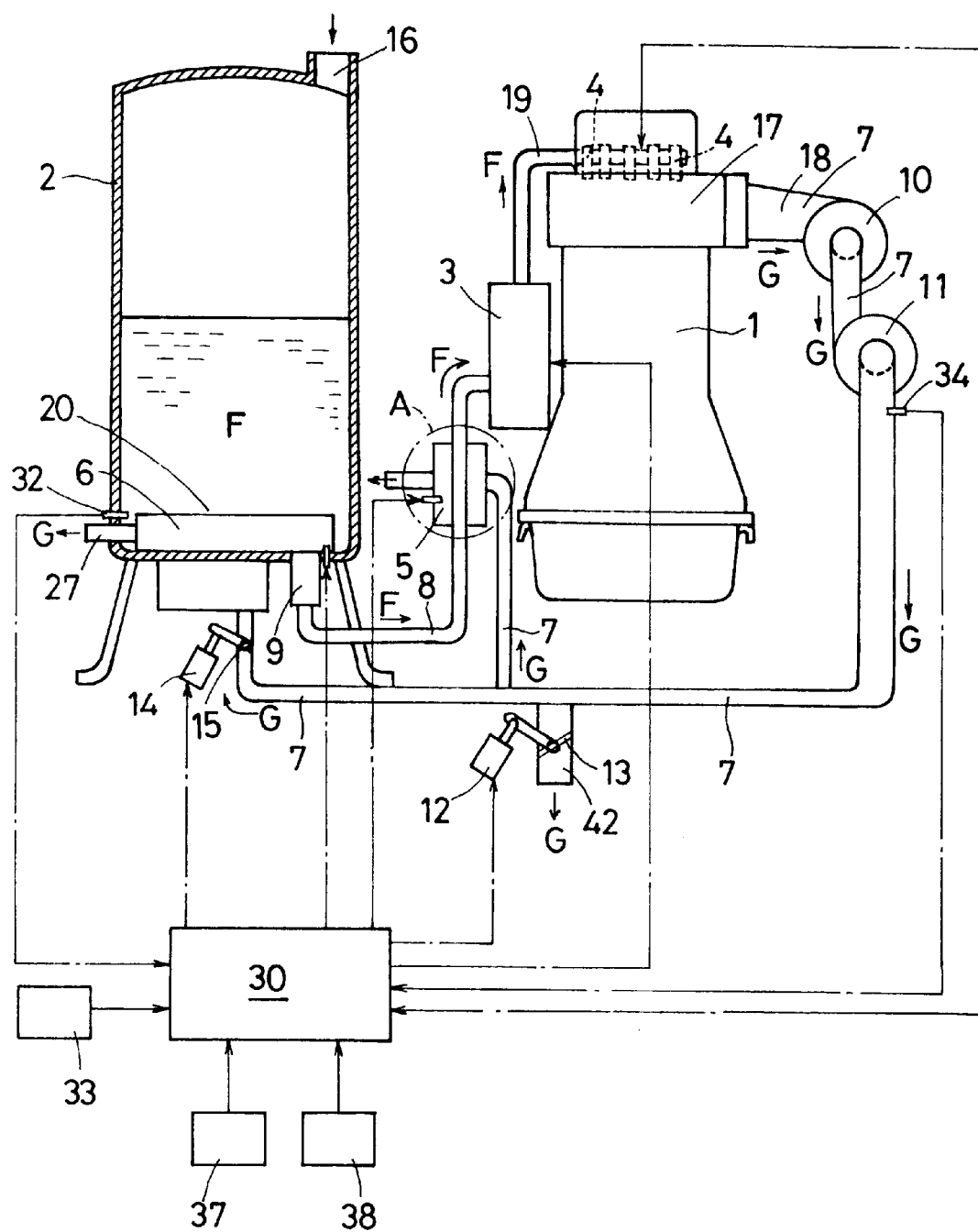
FIG. 1 is a partially sectioned explanatory view of an embodiment of the fuel heating apparatus for engines using a heavy oil as a fuel according to the present invention.

An embodiment of the fuel heating apparatus for engines using a heavy oil as a fuel will be described on the basis of the embodiments of the present invention shown in the attached drawings.

This fuel heating apparatus for engines using a heavy oil can be applied to the load dispatching cogeneration system using a diesel engine, provided with a large-scale fuel tank and disclosed in the patent application previously mentioned. The diesel engine is operated by making repeatedly in order four strokes, for example, a suction stroke, a compression stroke, an expansion stroke and an exhaust stroke, and has, for example, primary chamber of a heat insulating structure formed in a cylinder, a swirl chamber of a heat insulating structure communicating with the primary chamber through communication ports and formed in a cylinder head, and a piston reciprocatingly moved in the cylinder.

This fuel heating apparatus can be applied to a diesel engine 1 using a highly viscous heavy oil F as a fuel and provided with a fuel tank 2 holding the heavy oil F, a fuel injection pump 3 communicating with the fuel tank 2 through a fuel passage 8, and fuel injection nozzles 4 for injecting the fuel F into combustion chambers through the fuel supply passage 19 by an operation of the fuel injection pump 3, the apparatus being provided with a heat exchanger 6 as a heating unit in the fuel tank 2, and a heat exchanger 5 as a heating unit around the fuel passage 8.

The fuel tank 2 is provided at an upper portion thereof with a feed port 16 used to supply the fuel F thereto, and at a region 20 of an outlet for the fuel F in a bottom portion thereof with the heat exchanger 6 as a heating unit. The fuel injection pump 3 can be formed as, for example, an electromagnetic oil feeding pump so that the fuel injection timing can be controlled in accordance with an instruction from a controller 30. When occasion demands, heating units comprising heaters can be provided for the fuel injection pump 3 and fuel injection nozzles 4 so as to heat the heavy oil.

The diesel engine 1 is provided with an exhaust manifold 17 for collecting an exhaust gas G discharged from combustion chambers, an exhaust pipe 18 joined to an exhaust gas passage 7 communicating with the exhaust manifold 17, a turbocharger 10 communicating with the exhaust pipe 18 and operated by the exhaust gas energy, and an energy recovery turbine 11 disposed on the downstream side of the turbocharger 10. The exhaust gas G the thermal energy of which has been recovered by the energy recovery turbine 11 is sent to the heat exchanger 6 as a heating unit, which is provided in the fuel tank 2, through the exhaust gas passage 7, and the heat exchanger 5 as a heating unit provided around the fuel passage 8. The exhaust gas passage 7 is provided with an exhaust gas discharge pipe 42 having a valve 13 therein, the opening and closing of which are controlled by an actuator 12 operated in accordance with an instruction from the controller 30, by which valve 13 a flow rate of the exhaust gas G sent to the heat exchangers 5, 6 as heating units is regulated. The exhaust gas passage 7 extending to the heat exchanger 6 is provided with a valve 15 the opening and closing of which are controlled by an actuator 14 operated in accordance with an instruction from the controller 30, and a flow rate of the exhaust gas G sent to the heating unit 6 is controlled by this valve 15.

This fuel heating apparatus has a load sensor 37 for detecting an engine load on the basis of a fuel supply rate, a revolution sensor 38 for detecting a rotational frequency of the engine, a sensor for detecting an amount of the heavy oil, a sensor 34 for detecting the temperature of the exhaust gas, and a temperature sensor 33 for measuring the temperature of the atmospheric air.

The controller 30 receives detection signals from these various sensors, works to inject the heavy oil at a proper flow rate, which corresponds to the operating condition of the engine, into combustion chambers, and controls the fuel injection timing of the fuel injection nozzles 4 in response to the detection signals, whereby the fuel efficiency is improved. The opening and closing of the fuel injection nozzles 4 are controlled, for example, by an electromagnetic power, and the injection period is determined by the controller 30 when the engine is started and when the engine is in a steady operating condition, or in accordance with the temperature of the exhaust gas, the temperature of the atmospheric air, an engine load and the rotational frequency of the engine.

The fuel heating apparatus in an engine using a heavy oil as a fuel comprises mainly the fuel tank 2 holding the heavy oil F as a fuel, fuel injection pump 3 to which the heavy oil F in the fuel tank 2 is supplied through the fuel passage 8, fuel injection nozzles 4 for injecting the heavy oil F into the combustion chambers in the engine 1 by an operation of the fuel injection pump 3, exhaust gas passage 7 for discharging an exhaust gas occurring when the heavy oil F in the combustion chambers is ignited and burnt, heat exchanger 6 constituting the first heating unit which is provided in the outlet region 20 of the fuel tank 2 joined to the fuel passage 8, and which is adapted to heat the heavy oil F, and heat exchanger 5 constituting the second heating unit which is used to heat the heavy oil F and lower the viscosity thereof, and which is provided around the fuel passage 8.

The first and second heating units comprise heat exchangers 5, 6 for lowering the viscosity of the heavy oil F by heating the same with the thermal energy of the exhaust gas G discharged from the combustion chambers in the diesel engine, so as to give a fluidity to the heavy oil.

The heat exchangers 6, 5 constituting the first and second heating units comprise structures in which exhaust pipes (casing 21, exhaust pipe 27) of a ceramic material in which the exhaust gas G flows, and porous passages (ceramic pipe 22, porous ceramic member 26) formed of a pore-carrying wall (with open pores) are independently arranged, in which structures heat transfer surface areas are enlarged by utilizing porous ceramic members (porous ceramic material) so as to enable the transfer of heat from the exhaust gas to the fuel to be carried out excellently, and the heavy oil F to be efficiently heated. In order that the heavy oil F receives heat from the exhaust gas efficiently, it is preferable to, for example, provide ceramic lattices 25 (FIGS. 2 and 4) and porous ceramic members 39 (FIG. 3) comprising ceramic fiber in a ceramic pipe 22 in the heat exchanger 5, or form an exhaust gas passage comprising a porous wall of a porous ceramic member 23 in the casing 21. It is also preferable to form a fuel passage of a porous passage of the porous ceramic member 26 in the heat exchanger 6, and provide ceramic lattices 43 (refer to the reference numeral 25 in FIGS. 2 and 4) and porous ceramic members 43 (refer to the reference numeral 39 in FIG. 3) comprising ceramic fiber in the exhaust pipe 27.

In the heat exchanger 6, ceramic lattices or porous ceramic members 43 are provided in the exhaust pipe 27. In this heat exchanger 6, the area of the surface, which the exhaust gas G contacts, of the exhaust gas passage formed of the exhaust pipe 27 is set not less than three times as large as that of the surface, which the heavy oil F passing through the porous passage formed of the porous ceramic member 26 contacts.

In heat exchangers 5, 5A, 5B, ceramic lattices 25 or porous ceramic members 39 are provided in the ceramic pipes 22, and the area of the surfaces, which the exhaust gas G flowing through the exhaust gas passages of porous members 40 comprising porous ceramic members 23 or ceramic fiber contacts, is set not less than three times as large as that of the surfaces which the heavy oil F flowing through the ceramic pipes 22 contacts.

Figure 2:
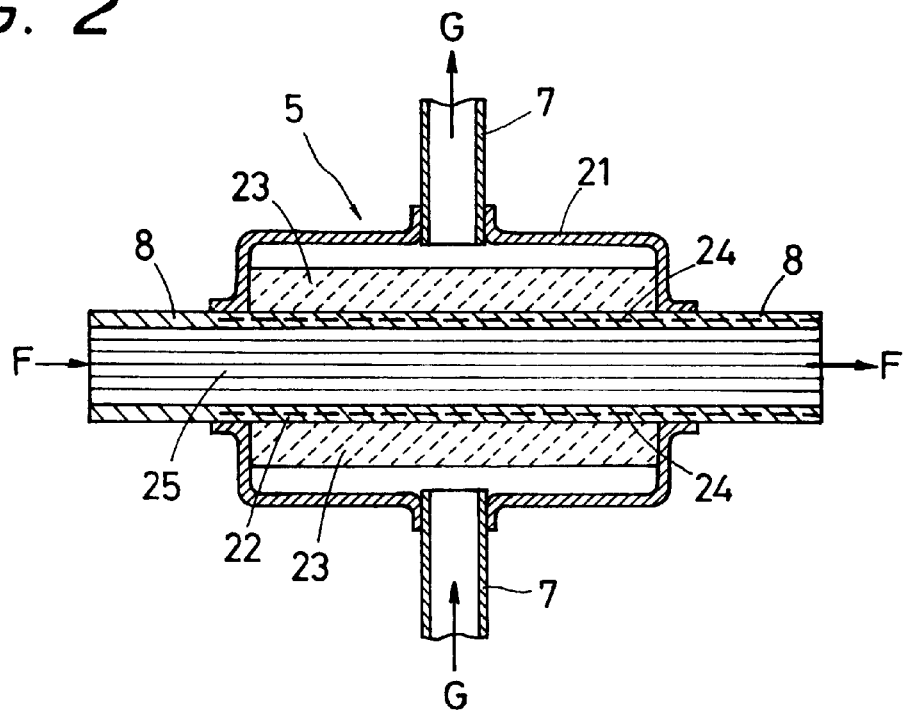
FIG. 2 is a sectional view of an example of a second heating unit in dashed circle A of FIG. 1.

As shown in FIG. 2, the heat exchanger 5 provided around the fuel passage 8 comprises mainly a casing 21 through which the exhaust gas G passes, a ceramic pipe 22 extending through the casing 21 and formed so that the heavy oil F passes therethrough, a porous ceramic member 23 provided in the casing 21 so as to cover the ceramic pipe 22, and a heater 24 buried in the ceramic pipe 22. In the ceramic pipe 22 in the heat exchanger 5, a ceramic lattice 25 is provided so as to enlarge the heat transfer surface area. A heating unit comprising such a heat exchanger 5 as mentioned above can also be provided in the fuel supply passage 19 extending from the fuel injection pump 3 and joined to the fuel injection nozzles 4, whereby the heavy oil F is heated.

Figure 3:
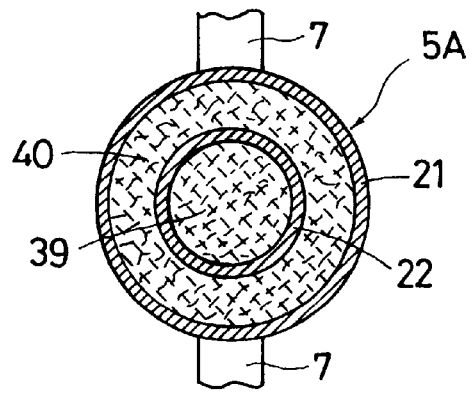
FIG. 3 is a sectional view of another example of the second heating unit of FIG. 1.
Figure 4:
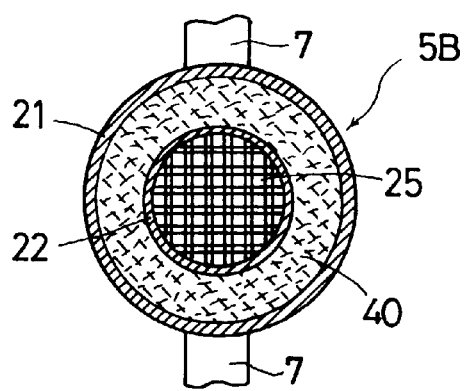
FIG. 4 is a sectional view of still another example of the second heating unit of FIG. 1.

The heat exchanger provided around the fuel passage 8 can also be formed like the heat exchanger 5A shown in FIG. 3 and the heat exchanger 5B shown in FIG. 4 in addition to the heat exchanger 5 shown in FIG. 2. The heat exchanger 5A comprises the ceramic pipe 22 extending through the casing 21 as shown in FIG. 3. In the ceramic pipe 22, in which the heavy oil F flows, a porous member 39 comprising ceramic fiber is provided, and, in the casing 21, in which the exhaust gas G flows, a porous member 40 comprising ceramic fiber is provided. In another example, the heat exchanger 5B comprises a ceramic pipe 22, in which the heavy oil F flows, this pipe 22 being provided therein with a ceramic lattice 25. The casing 21 in which the exhaust gas G flows is provided therein with a porous ceramic member 40 comprising ceramic fiber.

Figure 5:
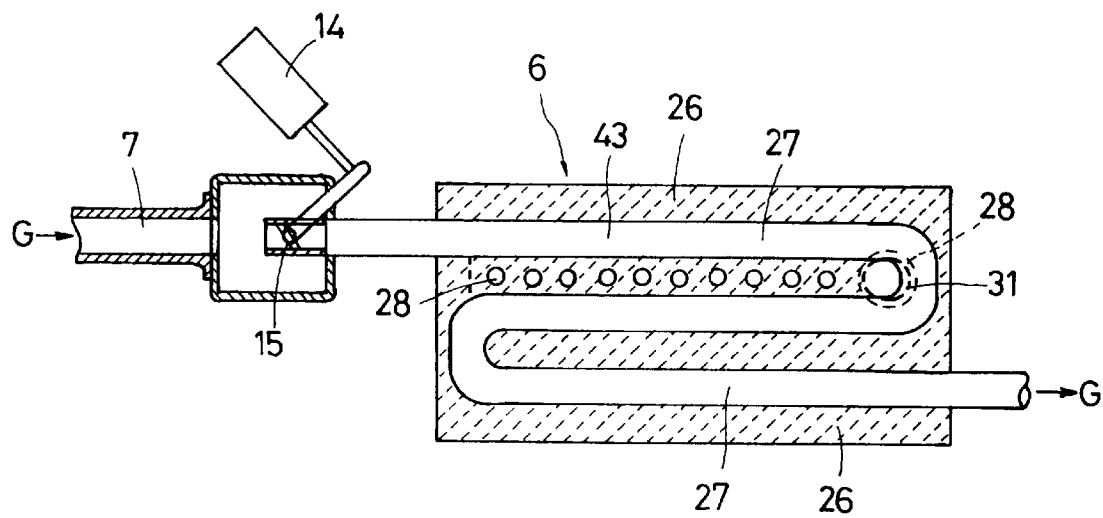
FIG. 5 is a horizontal sectional view of a first heating unit of FIG. 1.
Figure 6:
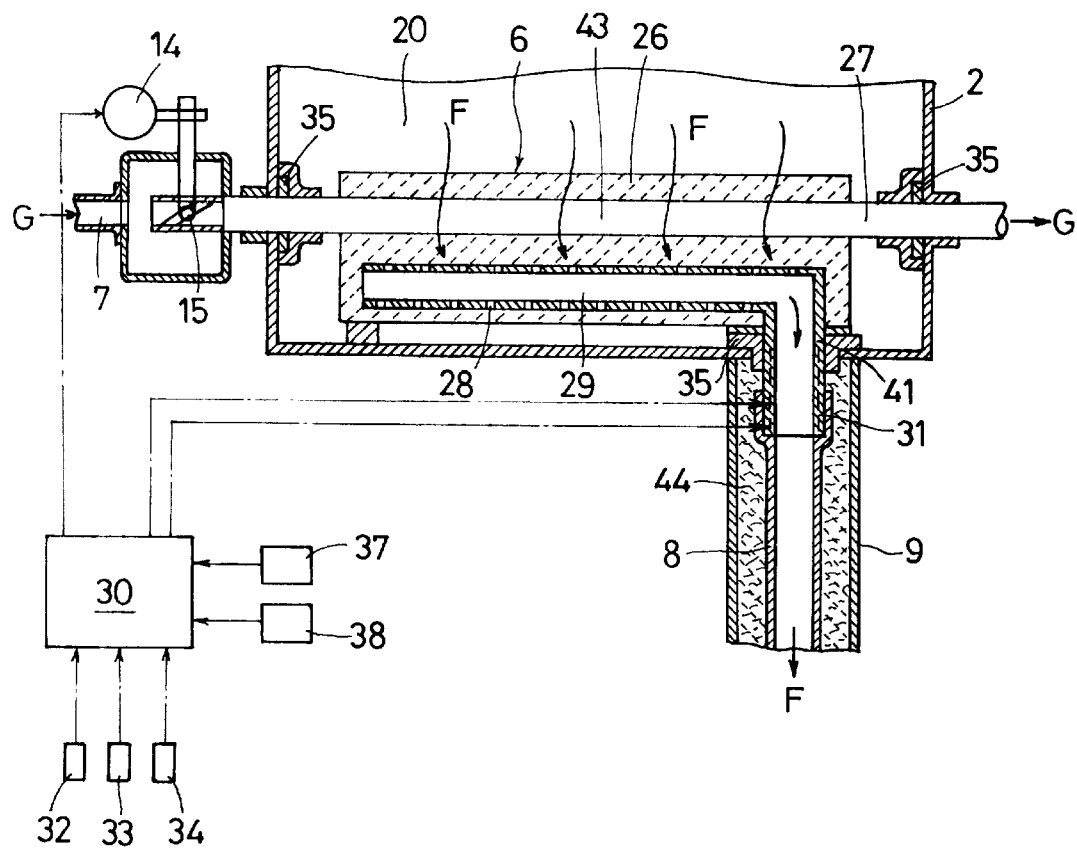
FIG. 6 is a longitudinal sectional view of the first heating unit of FIG. 5.

As shown in FIGS. 5 and 6, the heat exchanger 6 provided in the fuel tank 2 has a porous ceramic member 26 disposed in the outlet region 20 at the bottom portion of the fuel tank 2 and formed so that the heavy oil F passes therethrough, an exhaust pipe 27 formed in the porous ceramic member 26 and formed so that the exhaust gas passes therethrough, and a heater 31 buried in an outlet pipe 41 of a ceramic fuel pipe, which constitutes a ceramic pipe 29 buried in the porous passage-forming porous ceramic member 26 and an outlet portion integral with this ceramic pipe 29, so as to supply the heavy oil F which has passed through the porous passage of the porous ceramic member 26. The portion of the ceramic pipe 29 which is in the porous ceramic member 26 has a plurality of communication ports 28 communicating with the porous passage of the porous ceramic member 26. A heater 31 is buried in the portion of the ceramic outlet pipe 41 which projects from the porous ceramic member 26. A downstream end portion, which has passed through the fuel tank 2, of the exhaust pipe 27 is opened in the atmospheric air.

Accordingly, the heavy oil F in the fuel tank 2 receives heat from the exhaust pipe 27 in the heat exchanger 6, and the fluidization thereof is promoted, the resultant heavy oil flowing through the porous passage in the porous ceramic member 26 to enter the ceramic pipe 29 via the communication ports 28, the oil being then sent from the ceramic outlet pipe 41 into the fuel passage 8. Seal members 35 are provided on the portions of the wall surfaces of the fuel tank 2 through which the ceramic exhaust pipe 27 is passed, and on the portion of the wall surface of the fuel tank 2 through which the outlet pipe 41 is passed. Thus, the leakage of the heavy oil F to the outside of the fuel tank 2 is prevented by the seal members 35. The portion of the fuel passage 8 which corresponds to the fuel outlet portion of the fuel tank 2 is covered with a heat insulating material 44 comprising ceramic fiber and packed in the covering outlet pipe 9.

The heat exchangers 5, 6 as heating units can be formed, for example, in the following manner.

First, ceramic lattices and ceramic fiber are packed in a dense ceramic pipe comprising a calcined or sintered body, and the resultant product is placed in a mold with a filler of polyurethane foam, which is thermally incinerated, provided around the pipe. The polyurethane foam is impregnated with a ceramic slurry to form a molded body. The molded body is then sintered, whereby the polyurethane foam is thermally incinerated, and a plurality of open pores are formed in the same portion. A porous passage of a porous ceramic material, through which the fuel can be passed, is thereby formed, and, as a result, the heating units 5, 6 described above are obtained.

In this fuel heating apparatus, the heater 24 buried in the ceramic pipe 22 in the heat exchanger 5, and the heater 31 provided on the outlet pipe 41 in the heat exchanger 6 are turned on and off by the controller 30 in accordance with the temperature of the exhaust gas in the exhaust gas passage 7. For example, when the temperature of the exhaust gas G is low, i.e., when the diesel engine is started or in a low-load operation, the heaters are turned on, while, when the temperature of the exhaust gas G is high, i.e., when the engine is in a steady operation or high-load operation, the heaters are turned off. The controller 30 is formed so that it receives detection signals of the temperatures of the atmospheric air and exhaust gas and controls the ON and OFF of the heaters 24, 31.

What is claimed is:

1. A fuel heating apparatus for engines using a heavy oil as a fuel, comprising a heavy oil-holding fuel tank, a fuel injection pump to which said heavy oil is supplied from said fuel tank through a fuel passage, fuel injection nozzles adapted to inject said heavy oil into combustion chambers by an operation of said fuel injection pump, an exhaust gas passage through which an exhaust gas, which is generated when said heavy oil is ignited and burnt in said combustion chambers, is discharged, a first heating unit which is provided in the vicinity of a fuel outlet region of said fuel tank connected to said fuel passage, and which is adapted to heat said heavy oil by utilizing said exhaust gas, and a second heating unit which is provided in said fuel passage connected to said fuel injection pump, and which is adapted to heat said heavy oil by utilizing said exhaust gas, wherein said first heating unit comprises a member of a porous ceramic material provided in a bottom portion of said fuel tank and formed so that said heavy oil passes therethrough, an exhaust pipe provided in said porous ceramic member and forming a wall for separating passages for said exhaust gas and said heavy oil from each other, which exhaust pipe is joined at one end thereof to said exhaust pipe and opened at the other end thereof to the atmospheric air, a fuel pipe provided with communication ports from which said heavy oil passed through said passage formed of a porous ceramic member is discharged into said fuel passage, and a first heater provided in said fuel pipe.

2. A fuel heating apparatus for engines using a heavy oil as a fuel according to claim 1, wherein each of said first and second heating units comprises a heat exchanger adapted to heat said heavy oil with the thermal energy of said exhaust gas discharged from said combustion chambers, and thus reduce the viscosity of said heavy oil.

3. A fuel heating apparatus for engines using a heavy oil as a fuel according to claim 1, wherein said exhaust pipe in said first heating unit is provided with ceramic lattices or porous ceramic members, the exhaust gas contacting surface area of said exhaust passage formed by said exhaust pipe being set not less than three times as large as the area of the surface which said heavy oil passing through said porous passage formed of said porous ceramic member contacts.

4. A fuel heating apparatus for engines using a heavy oil as a fuel according to claim 1, wherein said ceramic pipe in said second heating unit is provided therein with ceramic lattices and porous ceramic members, the area of a surface which said exhaust gas flowing in said porous passage of said porous member contacts is set not less than three times as large as that of the surface which said heavy oil passing through said ceramic pipe contacts.

5. A fuel heating apparatus for engines using a heavy oil as a fuel according to claim 1, wherein said ceramic material constituting said first and second heating units comprises $Si_3N_4$, SiC or AlN having a high thermal conductivity.

6. A fuel heating apparatus for engines using a heavy oil as a fuel according to claim 1, wherein said exhaust gas passage is provided therein with an exhaust gas-operated turbocharger, and in the portion thereof which is on the downstream side of said turbocharger with an exhaust gas-operated energy recovery turbine.

7. A fuel heating apparatus for engines using a heavy oil as a fuel according to claim 1, wherein said first heating unit is provided with said first heater, said second heating unit being provided with said second heater, said first and second heaters being heated electrically when the temperatures of the outside air and exhaust gas are lower than predetermined levels, and turned off when these temperatures are higher than said predetermined levels.

8. A fuel heating apparatus for engines using a heavy oil as a fuel according to claim 1, wherein said apparatus has a first heavy oil heater provided in said first heating unit, a first exhaust gas control valve which is used to regulate a flow rate of said exhaust gas supplied to said first heating unit, and which is provided in said exhaust gas passage, a second heavy oil heater provided in said second heating unit, a second exhaust gas control valve which is used to regulate a flow rate of said exhaust gas supplied to said first and second heating unit, and which is provided in said exhaust gas passage, and a controller for controlling the operations of said first and second heaters and said first and second exhaust gas control valves.

9. A fuel heating apparatus for engines using a heavy oil as a fuel according to claim 7, wherein said controller is adapted to supply an electric current to said first and second heaters when the temperature of the outside air is low, and when said engine is started, and control the heating of said heavy oil.

10. A fuel heating apparatus for engines using a heavy oil as a fuel, comprising a heavy oil-holding fuel tank, a fuel injection pump to which said heavy oil is supplied from said fuel tank through a fuel passage, fuel injection nozzles adapted to inject said heavy oil into combustion chambers by an operation of said fuel injection pump, an exhaust gas passage through which an exhaust gas, which is generated when said heavy oil is ignited and burnt in said combustion chambers, is discharged, a first heating unit which is provided in the vicinity of a fuel outlet region of said fuel tank connected to said fuel passage, and which is adapted to heat said heavy oil by utilizing said exhaust gas, and a second heating unit which is provided in said fuel passage connected to said fuel injection pump, and which is adapted to heat said heavy oil by utilizing said exhaust gas, wherein said second heating unit comprises a casing through which said exhaust gas passes, a ceramic pipe extending through said casing and formed so that said heavy oil passes therethrough, a porous ceramic member provided in said casing so as to enclosed said ceramic pipe, and a second heater provided in said ceramic pipe.

11. A fuel heating apparatus for engines using a heavy oil as a fuel according to claim 10, wherein each of said first and second heating units comprises a heat exchanger adapted to heat said heavy oil with the thermal energy of said exhaust gas discharged from said combustion chambers, and thus reduce the viscosity of said heavy oil.

12. A fuel heating apparatus for engines using a heavy oil as a fuel according to claim 10, wherein a ceramic material constituting said first and second heating units comprises $Si_3N_4$, SiC or AlN having a high thermal conductivity.

13. A fuel heating apparatus for engines using a heavy oil as a fuel according to claim 10, wherein said exhaust gas passage is provided therein with an exhaust gas-operated turbocharger, and in the portion thereof which is on the downstream side of said turbocharger with an exhaust gas-operated energy recovery turbine.

14. A fuel heating apparatus for engines using a heavy oil as a fuel according to claim 10, wherein said first heating unit is provided with said first heater, said second heating unit being provided with said second heater, said first and second heaters being heated electrically when the temperatures of the outside air and exhaust gas are lower then predetermined levels, and turned off when these temperatures are higher than said predetermined levels.

15. A fuel heating apparatus for engines using a heavy oil as a fuel according to claim 10, wherein said apparatus has a first heavy oil heater provided in said first heating unit, a first exhaust gas control valve which is used to regulate a flow rate of said exhaust gas supplied to said first heating unit, and which is provided in said exhaust gas passage, a second heavy oil heater provided in said second heating unit, a second exhaust gas control valve which is used to regulate a flow rate of said exhaust gas supplied to said first and second heating unit, and which is provided in said exhaust gas passage, and a controller for controlling the operations of said first and second heaters and said first and second exhaust gas control valves.

16. A fuel heating apparatus for engines using a heavy oil as a fuel according to claim 13, wherein said controller is adapted to supply an electric current to said first and second heaters when the temperature of the outside air is low, and when said engine is started, and control the heating of said heavy oil.

\* \* \* \* \*